Figure 1:
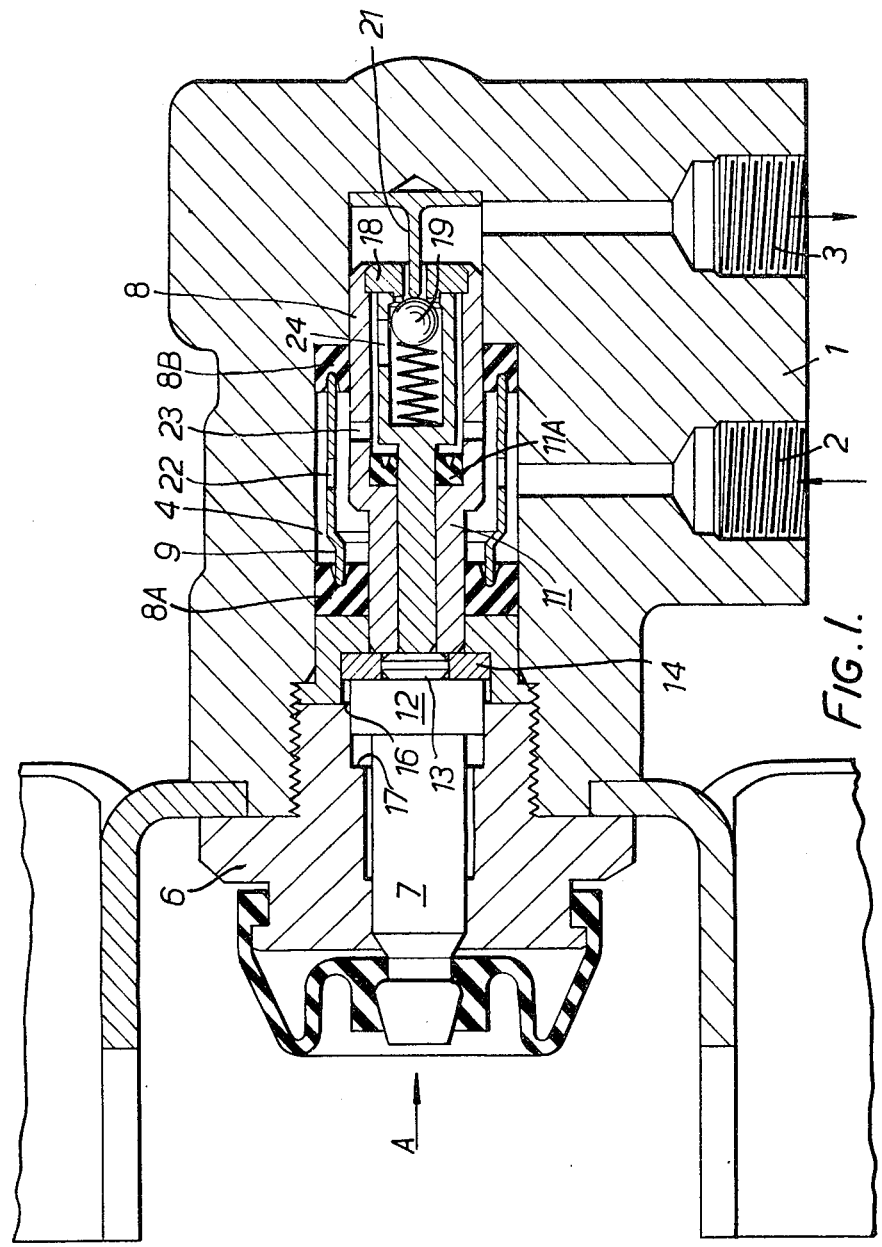

United States Patent [19]
Farr

[11] 3,945,688
[45] Mar. 23, 1976

[54] BRAKE PRESSURE CONTROL VALVES

[75] Inventor: Glyn Phillip Reginald Farr, Birmingham, England

[73] Assignee: Girling Limited, Birmingham, England

[22] Filed: May 23, 1974

[21] Appl. No.: 472,877

[30] Foreign Application Priority Data
May 23, 1973 United Kingdom............... 24586/73
June 21, 1973 United Kingdom............... 29563/73

[52] U.S. Cl............................................. 303/22 R
[51] Int. Cl.² ........................................... B60T 8/22
[58] Field of Search................. 303/6 C, 22 A, 22 R

[56] References Cited
UNITED STATES PATENTS

| | | |
|---|---|---|
| 3,762,776 | 10/1973 | Kawabe et al. .................... 303/22 R |
| 3,773,367 | 11/1973 | Osborne et al..................... 303/22 R |
| 3,841,713 | 10/1974 | Seip ................................... 303/22 R |

Primary Examiner—Duane A. Reger
Attorney, Agent, or Firm—Scrivener Parker Scrivener and Clarke

[57] ABSTRACT

A vehicle brake pressure control valve whose operating or cut-off point is determined by an external load applied to a movable member of the valve, is provided with means to ensure free fluid flow through the valve in the event of the external load diminishing or disappearing completely. The means may comprise an internal by-pass valve arrangement or means for preventing closure of the internal valve set, thus preventing closure (or "cut-off") under no-load conditions.

7 Claims, 3 Drawing Figures

BRAKE PRESSURE CONTROL VALVES

This invention relates to vehicle brake pressure control valves and more particularly to pressure reducing or limiting valves.

Brake pressure control valves typically comprise an internal valve set for controlling communication between the inlet and the outlet of the valve, and a load conscious member for transmitting an external load tending to hold the internal valve set open. Examples of such valves are described in British Pat. Specification No. 1183362.

In use, these valves are usually fitted in the pressure lines feeding the rear wheel brakes of a road vehicle, and the external load may either be variable in dependence upon the loading of the vehicle, or may be constant, for example being provided by a pre-set spring.

When the brakes are applied, the valve initially transmits liquid pressure freely to the rear brakes, but when the pressure rises above a level corresponding to the external load, the internal valve set closes, and either prevents any further increase in rear brake pressure, or ensures that the rear brake pressure is reduced, relative to the pressure transmitted to the inlet of the valve.

The pressure at which the valve operates (usually known as the "cut-off pressure"), is determined by the external load. The greater the load, the higher the pressure at which the internal valve set will close.

It is a disadvantage of such control valves that any failure in the load transmission will result in the valve operating prematurely in reducing the rear wheel brake pressure, relative to the front wheel pressure, so that the rear wheels will be under-braked. By the same token, the front wheel brakes will take a disproportionately high share of the braking effort, with the consequent risk of brake fade taking place at the front wheels.

The present invention aims at the provision of a brake pressure control valve constructed to avoid these disadvantages, and provides a brake pressure control valve comprising a housing having an inlet and an outlet, an internal valve set for interrupting communication between said inlet and said outlet; a load conscious member adapted to have an external load applied thereto and operable to resist closure of said internal valve set; and means operable in response to the value of said external load falling below a predetermined level to establish communication between said inlet and said outlet.

More specifically, the invention provides a brake pressure control valve comprising a housing having an inlet and an outlet; and internal valve set for controlling communication between said inlet and said outlet; and a load conscious member for transmitting an external load tending to hold the internal valve set open; and another movable valve part; wherein the load conscious member is normally movable in unison with said other movable valve part but is movable in one direction relative to said part when the value of the external load falls below a predetermined level, to establish free liquid communication between said inlet and said outlet.

With this construction, a failure of the external load will permit relative movement between the load conscious member and the other movable part of the valve, either to open up a by-pass passage, or to prevent the internal valve set from closing, thus ensuring that full system pressure will be maintained to the rear wheel brakes.

In each of the embodiments described below, the movable valve part is a first piston which is subjected on the one hand to internal pressure in the valve and on the other hand to the external load, and the load conscious member abuts or is fast with a second piston, relative axial movement of the two pistons being effective to open the by-pass passage or to prevent the internal valve set from closing.

The invention will be seen, from the following description of some particular examples thereof, to be applicable to a variety of different forms of control valve.

Figure 2:
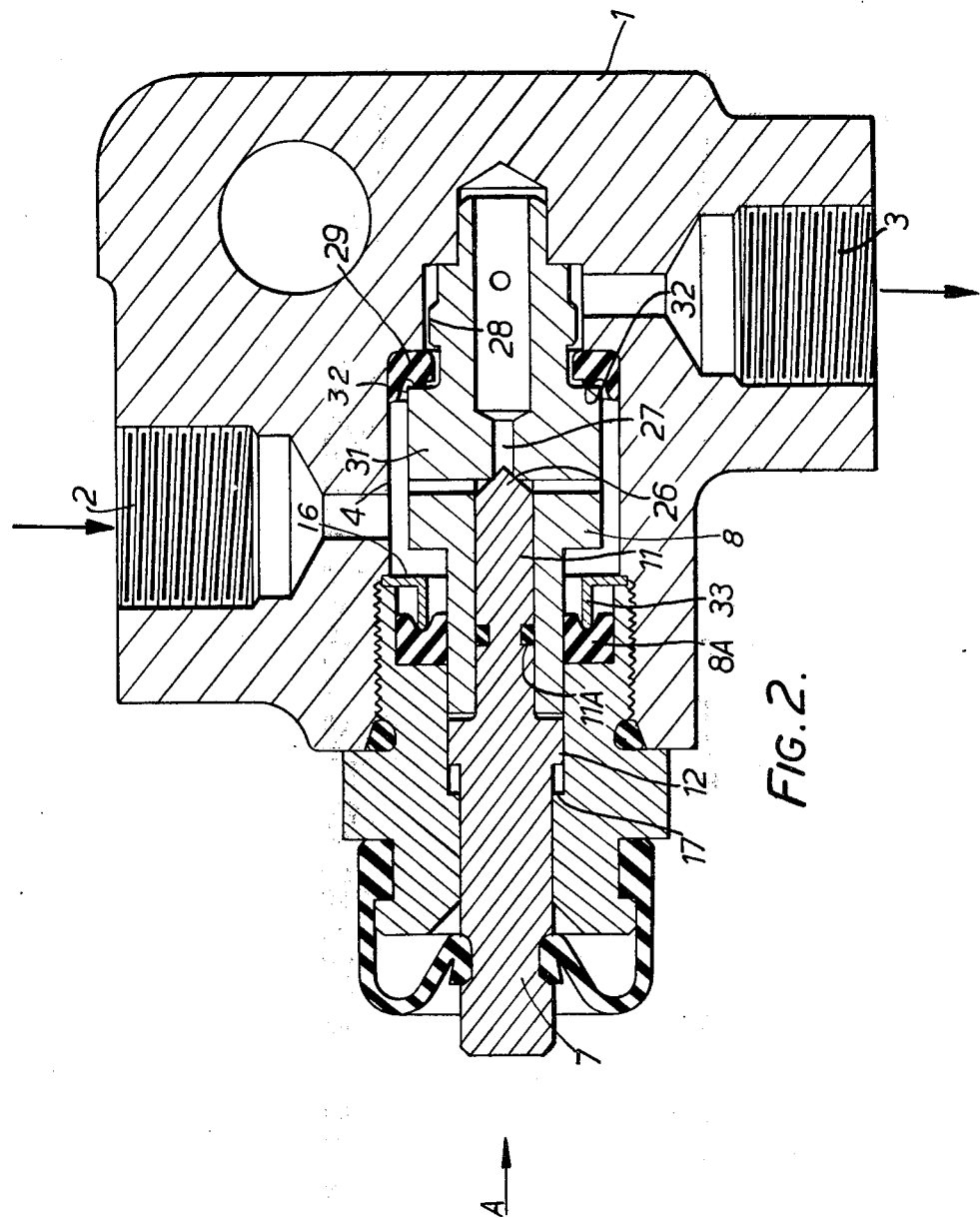
Figure 3:
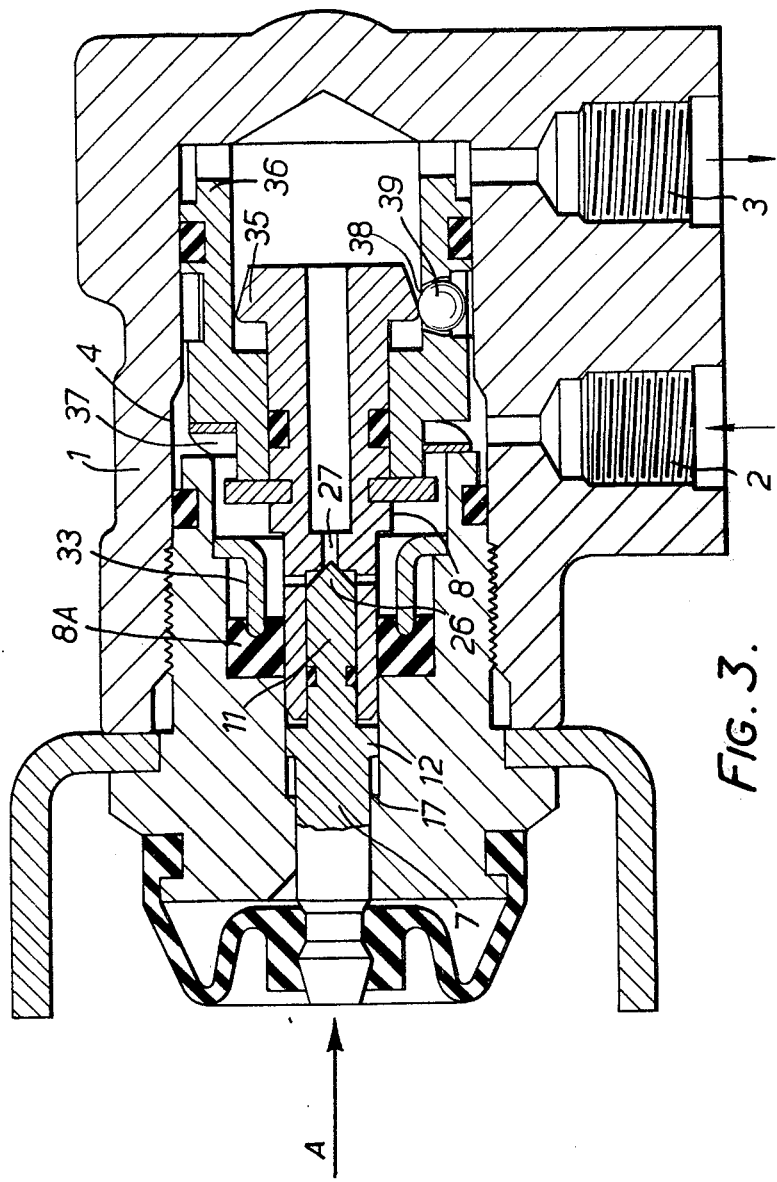

Three preferred forms of brake pressure control valve in accordance with the invention will now be described, by way of example, with reference to the accompanying drawings, in which:

FIGS. 1, 2 and 3 show the respective valves in axial cross-section.

In view of the general similarity of the valves, corresponding parts are given the same reference numerals in the three Figures.

In each embodiment, the valve comprises a housing 1 having an inlet 2 and an outlet 3 communicating with a valve bore 4, blind at its inner (right-hand) end and closed at its outer end by a closure plug 6 penetrated by a load conscious member in the form of a plunger 7 to which, in use, an external control load indicated by arrow A is applied. This load may be fixed, being applied by a prestressed spring, or variable in dependence upon the rear axle loading of the vehicle.

Referring now to FIG. 1, a first stepped piston 8 is sealed in the bore 4 by piston seals 8A and 8B positioned by a seal spacer 9. Mounted concentrically within the first piston is a second piston 11 slidably sealed to the first piston by a piston seal 11A. At their outer ends, the two pistons both bear on the inner (right-hand) end of the plunger 7, which has an enlarged head portion 12 and a spigot 13 for locating a loose collar 14, which is also engaged by the outer end of the first piston 8. In the inoperative position illustrated, the plunger and the two pistons are in their extreme right-hand positions and are movable to the left in unison against the external load A, until movement of the first piston is checked by the collar 14 encountering an internal shoulder 16. The plunger 7, and second piston 11 can move further to the left until the head 12 engages a second shoulder 17.

At its inner end the first piston 8 carries an inserted valve seat 18, closable by a spring-urged ball 19 housed by the second piston. A spigot insert 21 normally holds the ball off the valve seat, as shown. The internal flow passages through the valve are completed by passages 22, 23 and 24 in the side walls of spacer 9, and pistons 8 and 11 respectively.

In normal operation, with the load A at its designed value, brake application causes pressure fluid to flow through inlet 2, passages 22, 23 and 24 and the open valve seat 19 to the outlet. When the inlet pressure acting over the area of the first piston 8 sealed by seal 8A is sufficient to overcome the external load A, the two pistons move outwardly in unison with the plunger, thereby allowing the ball 19 to close the seat 18. Any additional inlet pressure acts on the unbalanced annular area or step of the first piston 8, which moves (in unison with the plunger 7 and piston 11) to the right to re-open the valve seat 18, this closing and opening action being repeated for as long as the inlet pressure increases, thereby metering fluid through to the outlet at a reduced rate relative to the increasing inlet pressure. Such metering actions in reducer valves are well known in themselves.

In the event of the external load being reduced below its design value, e.g. by failure of an external spring, the application of inlet pressure moves piston 8 outwardly until the ball valve 19 closes; then piston 11 moves outwardly to open the ball valve 19, causing the piston 8 to follow up until the collar 14 abuts shoulder 16; then piston 11 continues to move, relative to piston 8, until checked by engagement of the head 12 with shoulder 17, to ensure complete opening of the ball valve, which remains open, thus ensuring that full system pressure is transmitted to the rear brakes.

It will be noted that the valve ball 19 acts as the valve member which produces the required metering action in normal operation, and is disabled to maintain the required communication between the inlet and the outlet if the applied load fails (or diminishes in value below a predetermined minimum).

In the embodiment shown in FIG. 2, the piston 11 is integral or otherwise fast with the plunger 7 and its inner end is of conical shape to constitute a by-pass valve member 26 co-operating with, and normally sealing against, a by-pass port 27 formed in the first piston 8. A metering valve set is formed by a valve head 28 provided on the first piston 8, and an annular seal 29. An external shoulder 31 on the piston 8 normally engages the outer face of seal 29, which face is provided with circumferentially spaced protuberances 32, the gaps between which permit the normal flow of fluid from the inlet 1 to outlet 2 through the seat. In this embodiment the first piston 8 has just one external seal 8A, held in position by stop member 33.

Normal operation of the valve is similar to that of FIG. 1, inlet pressure working on the sealed area of pistons 8 and 11 until the pistons move to the left, against load A, to allow the valve head 28 to seat against the seal 29. The valve is re-opened by the increasing inlet pressure acting on the unbalanced area of the piston 8, i.e. the area within seal 29 minus the area within seal 8A.

In the event of failure of the load A, the piston 8 moves outwardly under the action of the inlet pressure, until the valve head 28 closes against its seat 29; piston 11 then moves, relative to piston 8, to open the by-pass port 27, the piston 8 then following up until it encounters the stop member 16; piston 11 carries on moving outwardly, relative to piston 8, until it encounters the shoulder 17. In this final position, the valve member 26 is clear of port 27, so that a by-pass communication is established between the inlet and the outlet.

In the embodiment of FIG. 3, the second piston 8 carries a valve operating head 35 and the piston is slidingly sealed within a sleeve 36, in turn slidingly sealed in the valve bore 4, in which it normally occupies its illustrated innermost position, due to the action of a corrugated spring washer 37 reacting against the inner end of the plug 6. The side wall of the sleeve is formed with a tapered valve port 38 accommodating a valve ball 39 which, in the normal position illustrated, is engaged and held off its seat in the tapered port by the edge of the head 35.

In operation, inlet pressure fluid passes freely through the port 38 to reach the outlet, until the pressure acting over the smaller sealed area of piston 8 is sufficient to move the piston outwardly against the external load A. Displacement of the piston 8 allows the valve ball 39 to seat and close the port 38. Any further pressure increase acts on the step of piston 8 to return it towards the illustrated position and thereby re-open port 38. This cyclic closing and opening of port 38 is repeated, with metering of fluid between the inlet and outlet, to produce a reduced rate of increase of outlet pressure, relative to the inlet.

Upon release of the inlet pressure, the piston sleeve 36 is forced outwardly, against the action of spring washer 37, to permit rapid reduction of the outlet pressure by increase of the fluid volume adjacent the outlet.

This form of reducer valve is known in itself from our prior British Pat. No. 1183362 and has proved highly effective in practice. The modification of this proven valve to incorporate the internal by-pass arrangement will render it even more effective in meeting the increasingly difficult technical requirements imposed by international vehicle safety regulations.

Although the invention has been particularly described in the context of pressure reducing valves, it will be readily understood by those skilled in the art that the constructional and operating principles involved could also be applied to pressure limiting and to pressure intensifying valves.

I claim:

1. A fluid pressure brake control valve comprising a housing having an inlet and an outlet; an internal valve set within said housing for controlling communication between said inlet and said outlet; a load conscious member for transmitting an external load to said valve set tending to hold it open, first fluid pressure responsive means exposed to pressure at said outlet and having an operative connection with said valve set tending to close it in response to pressure at said outlet in opposition to the external load transmitted thereto by said load conscious member, another movable valve part in said housing having an operative connection with said load conscious member enabling said other movable valve part and said load conscious member to move in unison or to move relatively with respect to each other, means operable in response to movement of said load conscious member in one direction relative to said other movable valve part to establish free fluid communication between said inlet and said outlet, means operable in response to movement of said load conscious member in unison with said other movable valve part for preventing said operable means from establishing said free communication between said inlet and said outlet so long as the external load acting on said member exceeds a predetermined value, and second fluid pressure responsive means exposed to pressure at said inlet and operatively connected to said load conscious member to move it in said one direction relative to said other movable valve part in response to pressure at said inlet when the external load acting on said member falls below a predetermined value thereby rendering said other movable value part operable to establish said free communication between said inlet and outlet.

2. A valve in accordance with claim 1 wherein said other movable valve part is a first piston engageable by said load conscious member and being subjected to the opposing forces of said external load and pressure at said outlet, the first fluid pressure responsive means being the face of said first piston exposed to pressure at said outlet, the second fluid pressure responsive means being a second piston having an operative connection with said load conscious member and a face exposed to the pressure of said inlet, relative axial movement of the two pistons being effective to establish free communication between said inlet and outlet.

3. A valve in accordance with claim 2 wherein said valve housing has separate abutments for limiting movement against the direction of the applied load of the first piston under the action of pressure at the inlet and second piston under the action of pressure at the outlet, said abutments being positioned to permit greater displacement of one piston than the other thereby ensuring sufficient relative axial displacement of the pistons to establish said free communication between the inlet and outlet in the event of the external load being removed.

4. A valve in accordance with claim 2, wherein one said piston extends in sealed, sliding relation into the other said piston.

5. A valve in accordance with claim 2, wherein said pistons carry respective co-operating parts of said internal valve set, said relative axial movement of said pistons moving said co-operating parts out of co-operative engagement with each other.

6. A valve in accordance with claim 5, wherein said parts comprise a valve seat carried by one piston and a closure member carried by the other.

7. A valve in accordance with claim 2, wherein one said piston is formed with a by-pass port and the other said piston has a by-pass valve closure member, the port and closure member being urged into sealing engagement with each other by the action of the external load.

* * * * *